(12) United States Patent
Sidler

(10) Patent No.: US 7,014,164 B2
(45) Date of Patent: Mar. 21, 2006

(54) DEVICE FOR PROTECTION AGAINST EXPLOSIONS IN PIPE-LINE

(75) Inventor: Hans Jörg Sidler, Eschenbach (CH)

(73) Assignee: SISTAG Absperrtechnik, Eschenbach (CH)

( * ) Notice: Subject to any disclaimer, the term of this patent is extended or adjusted under 35 U.S.C. 154(b) by 200 days.

(21) Appl. No.: 10/668,191

(22) Filed: Sep. 24, 2003

(65) Prior Publication Data

US 2004/0061085 A1 Apr. 1, 2004

(30) Foreign Application Priority Data

Sep. 25, 2002 (CH) ...................................... 1612/02

(51) Int. Cl.
*F16K 31/145* (2006.01)

(52) U.S. Cl. ....................................... 251/62; 251/326

(58) Field of Classification Search ......... 251/62–63.5, 251/326–329
See application file for complete search history.

(56) References Cited

U.S. PATENT DOCUMENTS 4,703,915 A * 11/1987 King ........................... 251/328
4,709,901 A * 12/1987 Pierson et al. ................ 251/58
6,010,112 A * 1/2000 Sidler ........................... 251/62

\* cited by examiner

*Primary Examiner*—J. Casimer Jacyna
(74) *Attorney, Agent, or Firm*—Wenderoth, Lind & Ponack, L.L.P.

(57) ABSTRACT

A shut-off device (1) for protection against explosions in a pipe-line is fitted with a slide valve plate (10) movable transversely to the direction of flow (A). The slide valve plate is connected via a piston rod (25, 26) to a piston (27, 28) slidably guided in a cylinder (35, 36) and actuated by a pressure medium. The pressure medium is supplied from a pressure medium reservoir via a closing valve (45) to a working chamber (46, 47) of the cylinder (35, 36), thereby actuating the piston and causing the slide valve plate (10) to move into a position closing the pipe passage (4). At least one cylinder (35, 36) is arranged within a pressure chamber (40) enclosed by a housing (30), which forms the pressure medium reservoir. Thus, a compact, space-saving shut-off device is created which can be shut within a very short time.

16 Claims, 2 Drawing Sheets

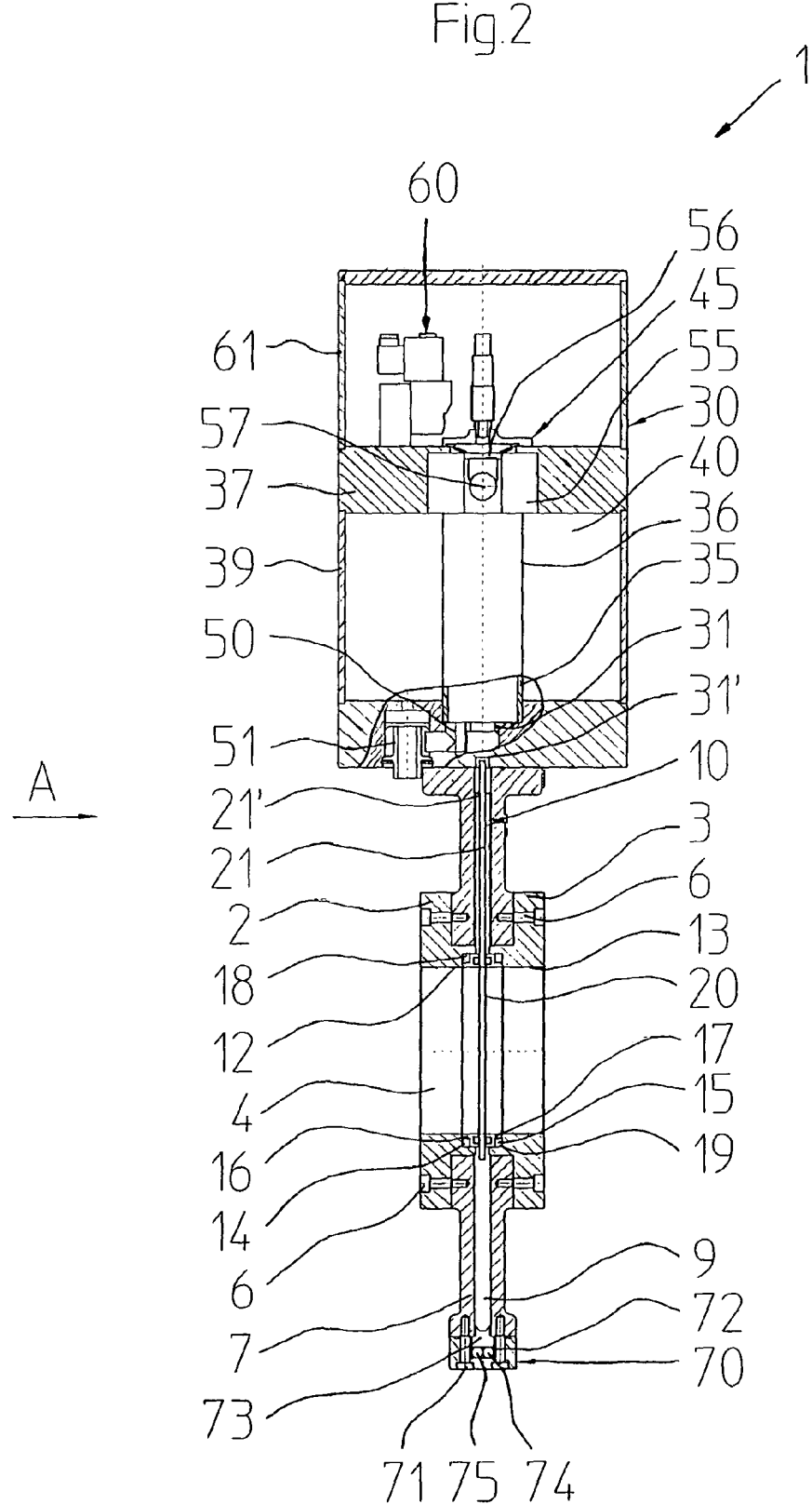

DEVICE FOR PROTECTION AGAINST EXPLOSIONS IN PIPE-LINE

BACKGROUND OF THE INVENTION

The present invention relates to a shut-off device for protection against explosions in a pipe-line.

A shut-off device for protection against explosions of this type is known for example from DE-A-198 21 756. This specification discloses a slide valve plate for rapid shutting of pipe-lines, connected to a piston slidable within a cylinder and actuated by a pressure medium. The pressure medium is supplied from an external pressure reservoir to a working chamber in the cylinder via a closing valve. As a flame detected in the pipe-line propagates or a sudden pressure rise is suddenly detected, the closing valve opens, the piston is actuated and the slide valve plate, which is movable transversely to the direction of flow, is brought into the closed position within the shortest possible time, making it possible to prevent flame propagation and thus an explosion. Such shut-off devices for protection against explosion are used especially in chemical or foodstuffs plants but also in mining, cement, textile and wood-processing plants where dust explosions can occur, triggered for example by a spark, friction, plant overheating etc. The disadvantage of these devices is, as a rule, that they take up a relatively great deal of space and their construction and assembly are complicated.

SUMMARY OF THE INVENTION

The task of the present invention is to create a shut-off device for protection against explosions of the type described above, which is simple to assemble, space-saving and can be shut within the shortest possible time.

This purpose is achieved in accordance with the present invention by the shut-off device for protection against explosion as described below.

Due to the fact that the cylinder is arranged within a pressure chamber enclosed by a housing which forms the pressure medium reservoir, there is no need for an external reservoir which would take up a lot of space, and a compact, space-saving shut-off device is created. In addition, the communication route between the pressure chamber and the working chamber is short so that a very short closing time can be achieved.

BRIEF DESCRIPTION OF THE DRAWINGS

The invention will now be explained in detail with reference to the drawings. The following is shown:

FIG. 2 is a longitudinal sectional through the shut-off device shown in FIG. 1.

DETAILED DESCRIPTION OF THE INVENTION

Figure 1:
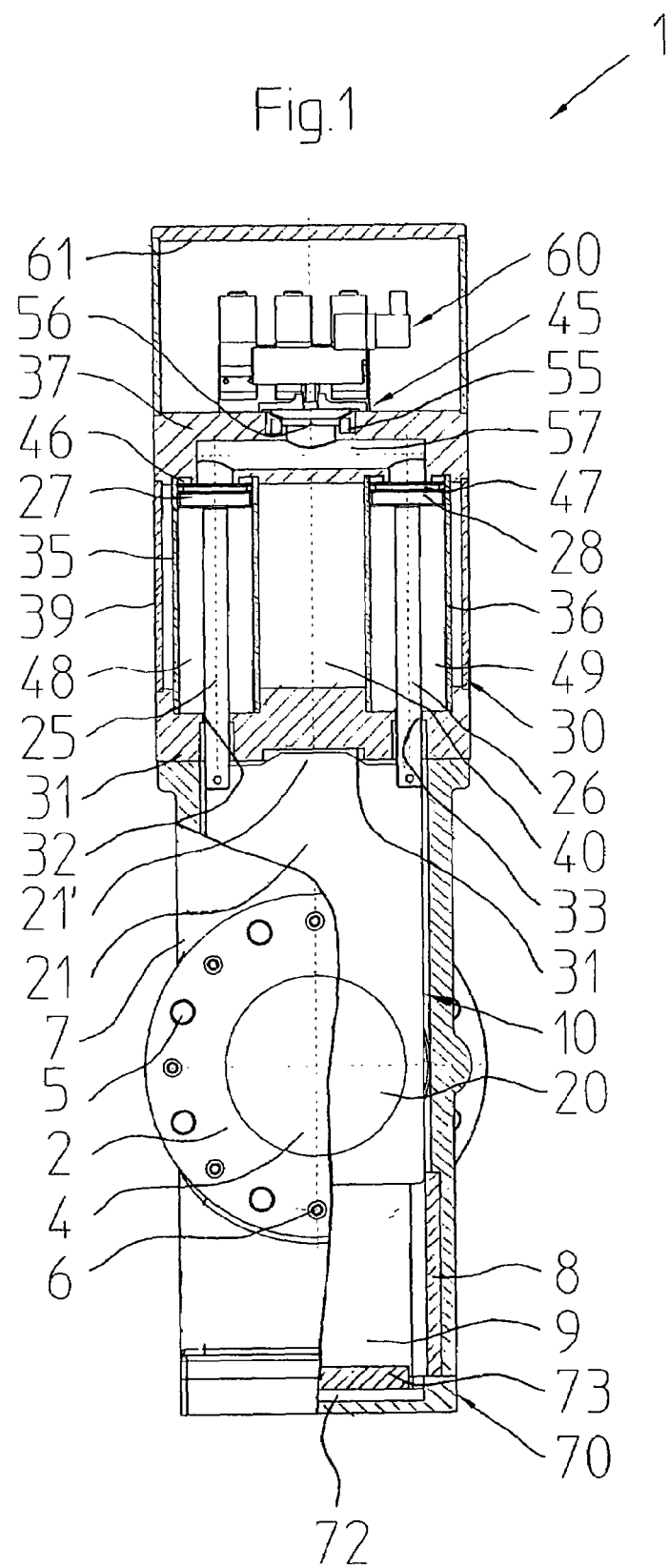
FIG. 1 is a front view and part sectional view of a shut-off device for protection against explosion constructed in accordance with the invention.

FIGS. 1 and 2 show a shut-off device 1 for rapid shutting of a pipe-line. The pipe-line, in which the shut-off device 1 is mounted transversely to the direction of flow A as in FIG. 2, is not shown on the drawing. The shut-off device 1 in accordance with the invention offers a simple way of connecting the pipeline at two flange parts 2, 3 (FIG. 2) forming a pipe passage 4. The flange parts are provided for this purpose with a number of bolt holes 5 (FIG. 1) at the face for bolting-on the pipe-line flanges. The flange parts 2, 3 are bolted to a slide valve housing 7 by means of the bolts 6. The slide valve housing 7 has a gap 9 in which a slide plate 10 is slidably arranged transversely to the direction of flow A.

The two flange parts 2, 3 have passages 12, 13 as shown in FIG. 2, with their diameter enlarged in the areas facing each other. Annular sealing elements 14, 15, each with a sealing ring 16, 17 fitted in the end face, are arranged in this area of the enlarged diameter of the through passages 12, 13. The two sealing rings 16, 17 sit sealingly at the slide valve plate 10 and form at the same time a guide for the movable slide valve plate 10. Therefore, they are made of a material with good sliding properties to ensure that the friction produced during the movement of the slide valve plate 10, which negatively affects the closing time, is as low as possible. The sealing elements 14, 15 in the enlarged part of the through passages 12, 13, can be fastened for example by means of carrier rings 18, 19 arranged at the periphery of the sealing elements 14, 15.

The slide valve plate 10 in the example shown here is in the form of what is referred to as a circular aperture valve plate which has a through aperture 20 opening up a pipe passage 4. The part of the slide valve plate 10 which shuts the pipe passage 4 as the slide valve plate 10 shifts, is designated by the numeral 21. In this area, the slide valve plate 10 is coupled on each side to a piston rod 25, 26 (FIG. 1). The piston rods 25, 26 are each connected to a piston 27, 28, and are slidably guided through an end wall 31 of a housing 30 (the guide apertures are designated in FIG. 1 by the numerals 32, 33) which is firmly connected to the valve housing 7. The pistons 27, 28 are each slidably guided in a cylinder 35, 36, extending between the end wall 31, which has already been mentioned, and another end wall 37 of the housing 30 located opposite to it. The housing 30 has in addition a jacket 39 connecting the two end walls 31, 37 and enclosing the pressure chamber 40 which houses the two cylinders 35, 36. In accordance with the invention, the pressure chamber 40 forms a reservoir for a pressure medium, preferably air (or another gas) supplied from a pressure source at a mains pressure common in industrial systems by means which are not described in detail here, envisaged to actuate the piston and to provide the associated movement of the slide valve plate 10 into a position shutting the pipe passage 4.

To actuate the piston, the pressure medium is introduced from the pressure chamber 40 via a closing valve 45 into a respective working chamber 46, 47 of the two cylinders 35, 36 which are formed between the pistons 27, 28 and the end wall 37 of the housing 30 forming the cylinder head. A displacement chamber 48, 49 located on the other side of the respective piston 27, 28 communicates with a quick-venting valve 51 via the outlet port 50 arranged in the end wall 31 in the area of the respective cylinder 35, 36 on the side of the slide valve plate (only one of these outlet ports 50 with a venting valve 51 is shown on the drawing—see also FIG. 2).

The closing valve 45 is fitted in the end wall 37 forming the cylinder head which also has a pressure chamber outlet port 55. Furthermore, a connecting duct 57, which is closable by a valve disk 56 of the closing valve 45, forks out and leads to the working chambers 46, 47 of the two cylinders 35, 36 and is formed in the end wall 37. The pressure chamber outlet port 55 communicates with the connecting duct 57 when the closing valve 45 is made to open. The closing valve 45 is constructed and controlled essentially in the same way as the type disclosed in DE-A-198 21 756 and will not be described here in detail. The control elements 60, which are available for controlling the movement of the piston or the slide valve plate and a part of the closing valve 45, are arranged on the end wall 37 outside the housing 30 and are encapsulated by a cap 61, which can be placed over the housing 30 to protect the control elements 60 from dust contamination and thus the resultant possible risk of explosion.

An end piece 70 (the bolts are designated by the numeral 71 in FIG. 2) includes a recess 72 adjoining the gap 9 in the housing 7, in which an abutment strip 73 extending over the width of the slide valve plate is guided in its movement in the direction of the slide valve plate 10. The end piece 70 is fixed to the slide valve housing 7 at its end facing away from the housing 30. Two or more elastomer parts 74, for example pieces of silicone cord, are loosely placed in the existing gaps 75, between the abutment strip 73 and the end piece 70. The abutment strip 73 is made resistant to the impact produced by the slide valve plate 10 moving into the closed position. Optimum damping of the impact is provided by the compressible elastomer parts 74 and the gaps 75 offering a possibility of deflection. The slide valve plate 10 does not need to be widened in the impact area which would otherwise disadvantageously increase its weight. The elastomer parts 74, which offer the advantage of multiple use, are very easy to replace when it is eventually necessary to do so. The elastomer parts 74 are also available as a finished product.

The shut-off device is compact and space-saving as well as simple to assemble and economic thanks to an arrangement of the cylinders 35, 36 in accordance with the invention in a pressure chamber 40 enclosed by a housing 30, forming a reservoir for the pressure medium. In addition, an especially short shutting time is achieved thanks to the direct arrangement of the pressure chamber outlet port 55 at the connecting duct 57 leading to the working chambers 46, 47.

It would be quite possible to accommodate in the pressure chamber 40, which forms the reservoir for the pressure medium, a single piston/cylinder unit co-acting with the slide valve plate 10 in place of the two adjacent piston/cylinder units, making the connecting route, between the pressure chamber and the working chamber possibly even shorter because the branch at the connecting duct 57 would be eliminated and the latter could terminate directly in the one working chamber. Using two piston/cylinder units with two piston rods 25, 26 located on the sides of the slide valve plate 10 is of advantage particularly when using a valve plate with a circular aperture because the area 21, which is rear-most in relation to the closing direction of the part 21 closing the pipe passage 4, is offset in relation to the fixing point of the piston rods 25, 26 and can even protrude into a recess 31' in the end wall 31 of the housing 30 on the side of the valve plate, thereby further shortening the total length of the shut-off device 1 and of the closing time. In addition, only a smaller weight needs to be set in motion when two smaller pistons are used, and the transmission of forces to the slide valve plate 10 is more favorable.

The slide valve plate 10 in the valve housing 7 is guided by the sealing rings 16, 17 fitted to the flange parts 2, 3 and also by plastic or coated metal guides 8 or the like on the side, in the lower part of the valve housing. By using these guides, the friction at the slide valve plate can be kept low, thereby allowing the pipe passage 4 to be shut at a faster speed. In addition, the sealing rings 16, 17 in the flange parts 2, 3 which are boltable to the slide valve housing 7 can be easily replaced without having to dismantle the valve housing 7.

The invention is sufficiently well explained on the basis of one example of a particular design. Of course, it could be designed in a different way. For example, two or more closing valves in adjacent locations could also be arranged in place of one closing valve 45.

What is claimed is:

1. A shut-off device for protection against explosion in a pipe-line, said shut-off device comprising:
   a piston slidably disposed in a cylinder so as to define a working chamber in said cylinder;
   a pressure medium housing surrounding said cylinder and forming a pressure medium reservoir, said housing having an end wall forming an end face of the pressure medium reservoir,
   said end wall defining a pressure chamber outlet port and a connecting duct leading to the working chamber of said cylinder,
   wherein said cylinder is arranged within said pressure medium reservoir, and said end wall of said housing delimits the working chamber of said cylinder;
   a slide valve plate slidable transversely to a direction of flow;
   a piston rod connecting said slide valve plate to said piston; and
   at least one closing valve for permitting selective communication between said pressure medium reservoir and said working chamber to permit actuation of said piston by a pressure medium and thereby move said slide valve plate to a closing position,
   said closing valve being fitted in said end wall of said pressure medium housing and having a valve disk for selectively closing said connecting duct, wherein said outlet port surrounds at least a portion of said connecting duct.

2. The shut-off device as claimed in claim 1, wherein said piston rod is slidably guided through a second end wall of said pressure medium housing.

3. The shut-off device as claimed in claim 2, further comprising a slide valve housing connected to said pressure medium housing, wherein said slide valve plate is arranged in a gap formed by said slide valve housing.

4. The shut-off device as claimed in claim 2, wherein the second end wall of said housing defines an outlet port, and said cylinder defines a displacement chamber on an opposite side of said piston relative to said working chamber, wherein said outlet port connects said displacement chamber to a quick-venting valve fitted in said second end wall.

5. The shut-off device as claimed in claim 3, wherein said slide valve plate includes a flow passage opening and a flow shut-off portion.

6. The shut-off device as claimed in claim 1, further comprising:
   a pair of opposed flange parts attached to said slide valve housing, said flange parts defining through passages which together form a through aperture, wherein the flow passage opening in said slide valve plate aligns with the through passages of said flange parts in an open position of said slide valve plate; and
   an annular sealing element fitted in an end face of each of said flange parts, each of said annular sealing elements having a sealing ring surrounding the respective through passage and forming a guide for said slide valve plate, each of said sealing rings being formed of a material having good sliding properties.

7. The shut-off device as claimed in claim 3, further comprising an abutment strip disposed in an end portion of said slide valve housing, and at least one elastomer part loosely placed between the abutment strip and an end piece connected to said slide valve housing.

8. The shut-off device as claimed in claim 1, further comprising a cap disposed on said pressure medium housing, wherein a part of the closing valve and other control elements for controlling the movement of said piston or of said slide valve plate are arranged outside of said pressure medium housing and are encapsulated by said cap.

9. A shut-off device for protection against explosion in a pipe-line, said shut-off device comprising:
   a first piston slidably disposed in a first cylinder so as to define a working chamber in said first cylinder;
   a second piston slidably disposed in a second cylinder so as to define a working chamber in said second cylinder, wherein said first and second cylinders are arranged in parallel to each other;
   a pressure medium housing surrounding said first and second cylinders, said pressure medium housing forming a pressure medium reservoir, said pressure medium housing having a first end wall forming an end face of said pressure medium reservoir,
   said first end wall defining a pressure chamber outlet port and a forked connecting duct leading to the working chambers of said first and second cylinders, wherein said first and second cylinders are arranged within said pressure medium reservoir, and said first end wall of said housing forms a cylinder head that delimits the working chambers of said first and second cylinders;
   a slide valve plate slidable transversely to a direction of flow;
   a first piston rod connecting said first piston to a first side area of said slide valve plate;
   a second piston rod connecting said second piston to a second side area of said slide valve plate; and
   a closing valve for permitting selective communication between said pressure medium reservoir and said working chambers of said first and second cylinders via said forked connecting duct to permit actuation of said first and second pistons by a pressure medium, thereby moving said slide valve plate to a closed position,
   wherein said closing valve is fitted in said first end wall of said housing and has a valve disk for selectively closing said forked connecting duct, wherein said outlet port surrounds at least a portion of said forked connecting duct.

10. The shut-off device as claimed in claim 9, wherein said piston rod is slidably guided through a second end wall of said pressure medium housing.

11. The shut-off device as claimed in claim 10, further comprising a slide valve housing connected to said pressure medium housing, wherein said slide valve plate is arranged in a gap formed by said slide valve housing.

12. The shut-off device as claimed in claim 10, wherein the second end wall of said housing defines an outlet port, and said first and second cylinders define a displacement chamber on an opposite side of said piston relative to said working chamber,
   wherein said outlet port connects said displacement chamber to a quick-venting valve fitted in said second end wall.

13. The shut-off device as claimed in claim 11, wherein said slide valve plate includes a flow passage opening and a flow shut-off part.

14. The shut-off device as claimed in claim 9, further comprising:
   a pair of opposed flange parts attached to said slide valve housing, said flange parts defining through passages which together form a through aperture, wherein the flow passage opening in said slide valve plate aligns with the through passages of said flange parts in an open position of said slide valve plate; and
   an annular sealing element fitted in an end face of each of said flange parts, each of said annular sealing elements having a sealing ring surrounding the respective through passage and forming a guide for said slide valve plate, said sealing rings being formed of a material having good sliding properties.

15. The shut-off device as claimed in claim 11, further comprising an abutment strip disposed in an end portion of said slide valve housing, and at least one elastomer part loosely placed between the abutment strip and an end piece connected to said slide valve housing.

16. The shut-off device as claimed in claim 9, further comprising a cap disposed on said pressure medium housing,
   wherein a part of the closing valve and other control elements for controlling the movement of said piston or of said slide valve plate are arranged outside of said pressure medium housing and are encapsulated by said cap.

* * * * *